United States Patent [19]
Kitamura

[11] 4,367,912
[45] Jan. 11, 1983

[54] LIGHT DEFLECTING APPARATUS

[75] Inventor: Takashi Kitamura, Yokohama, Japan

[73] Assignee: Canon Kabushiki Kaisha, Tokyo, Japan

[21] Appl. No.: 132,880

[22] Filed: Mar. 24, 1980

[30] Foreign Application Priority Data

Mar. 29, 1979 [JP] Japan .................. 54-37391

[51] Int. Cl.³ .............................. G02B 27/17
[52] U.S. Cl. .................... 350/6.8; 350/590
[58] Field of Search ............ 350/6.8, 6.9, 6.5, 6.7,
350/486, 289, 65; 358/295, 206, 293; 38/206;
340/98; 356/213; 346/108, 145

[56] References Cited

U.S. PATENT DOCUMENTS

| | | | |
|---|---|---|---|
| 2,101,122 | 12/1937 | Woodside | 356/213 |
| 3,835,249 | 9/1974 | Dattilo et al. | 350/6.8 |
| 3,845,298 | 10/1974 | Runciman | 350/6.8 |
| 3,961,838 | 6/1976 | Zanoni | 350/6.8 |
| 4,104,614 | 8/1978 | Litman | 350/99 |
| 4,104,615 | 8/1978 | Hunter | 350/99 |
| 4,105,286 | 8/1978 | Curran | 350/99 |
| 4,183,622 | 1/1980 | Malgariu | 350/99 |
| 4,227,776 | 10/1980 | Morton et al. | 362/259 |
| 4,297,713 | 10/1981 | Ichikawa et al. | 350/6.8 |

*Primary Examiner*—Jon W. Henry
*Attorney, Agent, or Firm*—Fitzpatrick, Cella, Harper & Scinto

[57] ABSTRACT

A light deflecting apparatus includes a mirror for deflecting an incident light beam, a case enclosing the mirror, a base plate to which the case is attached, and a light source for generating the beam attached to the case in spaced apart relationship with the base plate.

17 Claims, 17 Drawing Figures

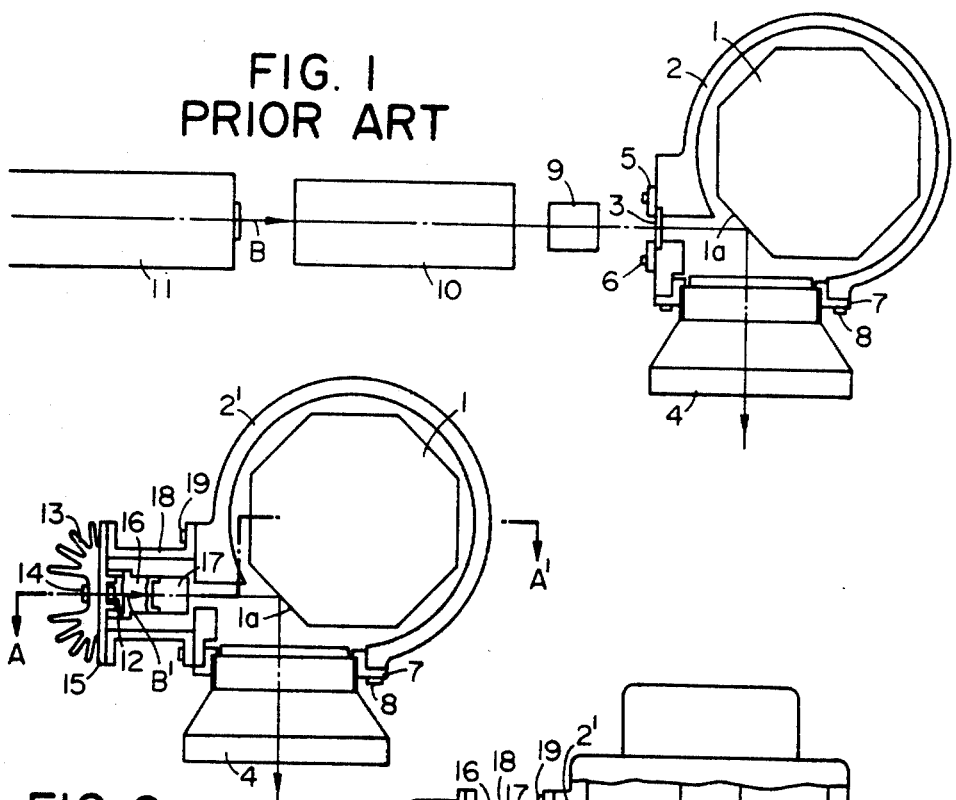
FIG. 1 PRIOR ART
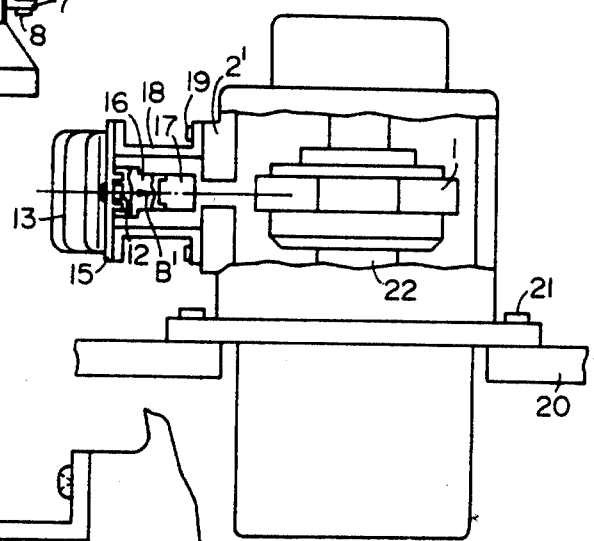
FIG. 2
FIG. 3
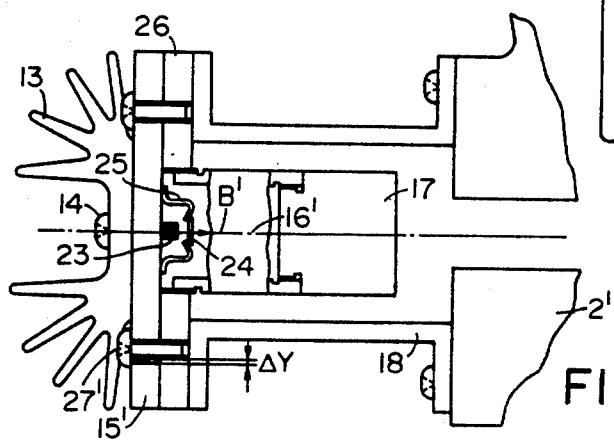
FIG. 4

LIGHT DEFLECTING APPARATUS

BACKGROUND OF THE INVENTION

1. Field of the Invention

This invention relates to a light deflecting apparatus for deflecting the angle of emergence of an incident light beam.

2. Description of the Prior Art

It is known to cause information light modulated by information signals to be deflected by the use of a mirror or other deflecting means and cause the modulated light to scan over a scanned surface on which a photosensitive medium is disposed, thereby effecting recording of the information signals or read-out of the information on the scanned surface. There have been devised various types of such light deflecting apparatus, one of which is the rotatable polygon mirror type light deflecting apparatus. This rotatable polygon mirror type light deflecting apparatus is high in deflection speed and capable of continuous light deflection and therefore, capable of recording or reading out high-density information at high speed.

FIG. 1 of the accompanying drawings is a cross-sectional view of a scanning optical system using a conventional rotatable polygon mirror type light deflecting apparatus.

In FIG. 1, reference numeral 1 designates a rotatable polygon mirror, 2 the outer case of the light deflecting apparatus, 3 an incidence window glass, 4 an image forming f·θ lens, 9 a beam expander, 10 a light modulator, and 11 an He-Ne laser. The incidence window glass 3 is attached to the outer case 2 by a window glass keeper 5 secured to the outer case 2 by means of a screw 6, and the f·θ lens 4 is mounted by being screwed into a lens adapter 7 secured to the outer case 2 by means of screws 8. The outer case 2 shields the rotatable polygon mirror 1 from the ambient air to prevent the mirror surface of the rotatable polygon mirror 1 from being contaminated by dust, oil or the like in the air.

The laser beam B emitted from the He-Ne laser 11 is modulated by the light modulator 10 in accordance with recording information or the like and has its beam diameter expanded by the beam expander 9 and passes through the incidence window glass 3 to the rotatable polygon mirror 1. Further, the laser beam B is deflected by the mirror surface 1a whose angle is being varied by the rotation of the rotatable polygon mirror 1, and forms an image on a scanned surface (not shown) with the aid of the f·θ lens 4.

Heretofore, when recording or read-out of information is effected by the use of a light deflecting apparatus, it has been common practice to use He-Ne or like gas laser as the light source, as shown in FIG. 1, but the gas laser is bulky in size and has suffered from a disadvantage that it occupies extensive space in the system. In contrast, a semiconductor laser which has made its advent in recent years is much smaller in size than the gas laser and has the function of a light modulator as well and, if a semiconductor laser could be used in such a scanning optical system, it would be possible to make the scanning optical system compact.

SUMMARY OF THE INVENTION

In view of this, the present invention intends to provide a light deflecting apparatus which is compact, inexpensive and easy to handle, in order to make the most of the feature of the compact semiconductor laser.

It is another object of the present invention to provide a light modulating apparatus in which the position of the mirror is manually rotatable to thereby facilitate the measurement of the laser beam output.

Other objects of the present invention will become apparent from the following detailed description taken in conjunction with the accompanying drawings.

BRIEF DESCRIPTION OF THE DRAWINGS

FIG. 1 is a cross-sectional view of a scanning optical system using the light deflecting apparatus according to the prior art.

FIG. 2 is a cross-sectional plan view of the light deflecting apparatus according to a first embodiment of the present invention.

FIG. 3 is a cross-sectional view taken along line AA' of FIG. 2.

FIG. 4 is a fragmentary cross-sectional view of a second embodiment of the present invention.

DESCRIPTION OF THE PREFERRED EMBODIMENTS

Figure 5:
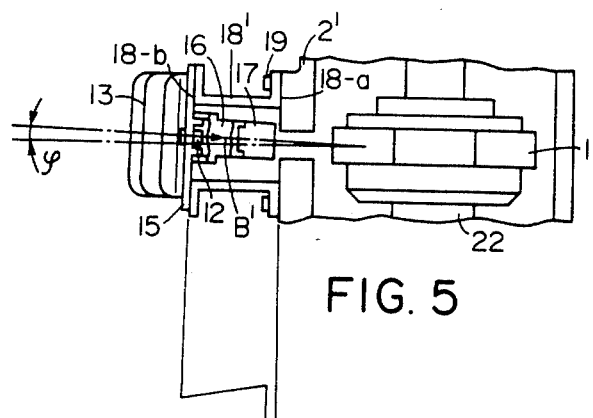
FIG. 5 is a fragmentary cross-sectional view of a third embodiment of the present invention.

In FIGS. 2 and 3, numbers similar to those in FIG. 1 designate members similar to those in FIG. 1.

Referring to FIGS. 2 and 3, reference numeral 12 designates a semiconductor laser, 16 a collimator lens, 17 a cylindrical beam expander, and 13 heat radiating fins secured to the base 15 of the semi-conductor laser 12 by means of a screw 14. The collimator lens 16 is securely screwed into a threaded portion provided in the base 15, and the cylindrical beam expander 17 is securely screwed into a threaded portion provided in the collimator lens 16. The base 15 is secured to a holding cylinder 18 by means of screws (not shown), and the holding cylinder 18 in turn is secured to an outer case 2' by means of screws 19.

Usually, the laser beam emitted from the semiconductor laser is a divergent beam having different divergence angles in two right angle directions and must be made into a parallel beam. The collimator lens 16 is used for this purpose. Further, the cross-sectional shape of the so collimated beam is elliptical and therefore, as required, the cylindrical beam expander 17 is provided rearwardly of the collimator lens 16 to make the cross-sectional shape of the beam circular. Also, the semiconductor laser has its performance varied by temperature variation and therefore, temperature must always be maintained constant, particularly at a low temperature to prolong the life of the laser. Therefore, a heat pump such as Peltier element must be placed near the laser chip (not shown) of the semiconductor laser to cool the laser chip, and a member for outwardly discharging the taken heat is necessary. The heat radiating fins 13 are the means for discharging the heat radiation.

Now, the laser beam B' emitted from the semiconductor laser 12 is made into a parallel beam of circular cross-section by the collimator lens 16 and cylindrical beam expander 17, as described above, and reaches the mirror surface 1a. The laser beam deflected by the mirror surface 1a is imaged on a scanned surface (not shown) by the f-θ lens 4 as in the prior art shown in FIG. 1.

In FIG. 3, reference numeral 20 designates a base plate to which the light deflecting apparatus is securely attached by means of screws 21, and 22 denotes a rotary shaft on which the polygon mirror is mounted.

FIG. 4 is a fragmentary cross-sectional view of a second embodiment of the light deflecting apparatus in which the semiconductor laser 12 is movable in a direction perpendicular to the optic axis of the collimator lens 16 in FIGS. 2 and 3.

In the light deflecting apparatus of FIGS. 2 and 3, the emergence portion of the laser chip 23 (shown in FIG. 4) of the semiconductor laser 12 must be placed exactly at the focus of the collimator lens 16. If the emergence portion of the laser chip 23 is deviated from the focus of the collimater lens, an inclination will be created in the direction of the beam after having left the collimator lens 16 or the image forming spot on the scanned surface will be blurred. In FIG. 4, a lens mounting plate 26 is provided between the base 15' and the collimator lens 16', and the collimator lens 16' is screwed into the lens mounting plate 26. The position adjustment of the emergence portion of the laser chip 23 in the direction perpendicular to the optic axis of the collimator lens 16' is accomplished by offsetting the base 15' relative to the lens mounting plate 26 in the range of back-lash ΔY of the insertion hole for the screw 27'. Further, the position adjustment in the direction of the optic axis is accomplished by adjusting the amount in which the collimator lens 16' is screwed into the lens mounting plate 26.

In FIG. 4, reference numeral 25 designates a laser protecting cap for the semiconductor laser, and 24 denotes a laser emergence window glass.

FIG. 5 is a fragmentary cross-sectional view of a third embodiment of the present invention in which the incident beam is inclined by a small angle φ with respect to a plane formed when a straight line perpendicular to the mirror surface is rotated about the rotary shaft. When the light beam is scanned by a rotatable polygon mirror and if the polygon mirror is, for example, an eight-surface mirror, the beam reflected and scattered by the scanned surface is again reflected by a mirror surface neighboring to that mirror surface which is deflecting the beam and the beam reaches the scanned surface and forms a ghost image at a predetermined point on the scanned surface. Such ghost image can be prevented by inclining the angle of the incident beam with respect to the mirror surface and causing the ghost image to escape outwardly of the scanned surface.

In FIG. 5, the formation of the ghost image is prevented by inclining the mounting surface 18-b of the holding cylinder 18' adjacent to the base 15 by an angle φ with respect to the mounting surface 18-a of the holding cylinder 18' adjacent to the outer case 2'.

Figure 6:
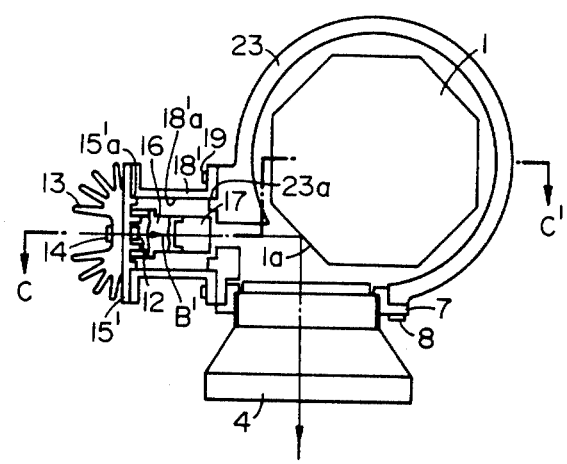
FIG. 6 is a cross-sectional plan view of a fourth embodiment of the present invention.
Figure 7:
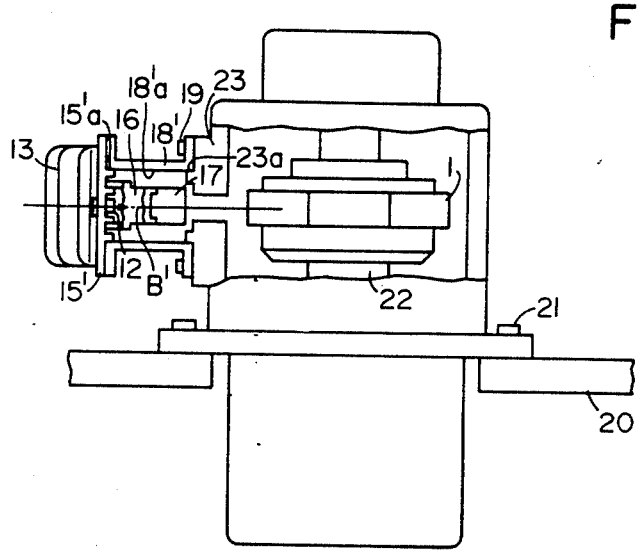
FIG. 7 is a cross-sectional view taken along line CC' of FIG. 6.

FIGS. 6 and 7 show another embodiment in which the semiconductor laser 12 can be mounted at a proper position relative to the rotatable polygon mirror 1. The inside diameter surface 18'a of the holding cylinder 18' fits on a cylindrical surface projected portion 15'a provided on the base 15' and a cylindrical surface projected portion 23a provided on the outer case 23, and the semiconductor laser 12 is located relative to the rotatable polygon mirror 1. That is, the inside diameter surface 18'a of the holding cylinder 18 and the cylindrical surface projected portion 23a together constitute a cylindrical fitting portion. According to such a construction, when the laser is replaced by a new one for the purpose of assembly or maintenance, the assembly and replacement of the laser can be effected without any adjustment thereof. The locating means is not restricted to the cylindrical fitting portion as shown in the present embodiment, but may be locating pins or the like.

Figure 8A:
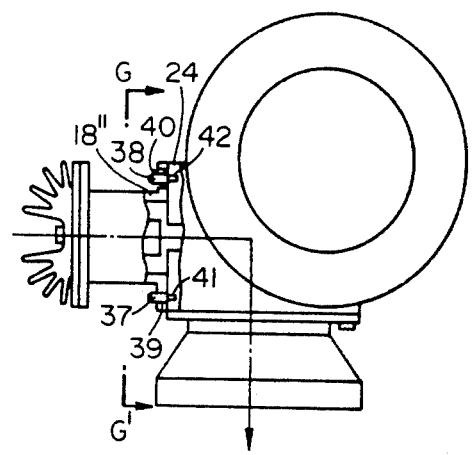
FIG. 8A is a plan view showing a modification of the fourth embodiment.
Figure 8B:
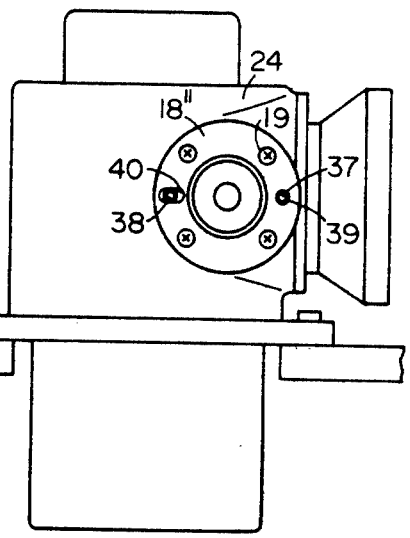
FIG. 8B is a cross-sectional view taken along line GG' of FIG. 8A.

FIGS. 8A and 8B show an example of such case. Locating pins 37 and 38 are forced into holes 41 and 42 in the outer case 24. On the other hand, the holding cylinder 18" is provided with pin-holes 39 and 40. Locating is accomplished by the locating pins 37 and 38 fitting into the pin-holes 39 and 40. The pin-hole 40 is in the form of a slot so as to absorb any pitch error of the pins 37 and 38. If locating pins are used, the locating in the rotational direction about the optic axis can also be accurately accomplished and therefore, the major axis and minor axis directions of the elliptical beam cross-section can be accurately adjusted. Accordingly, the beam cross-section can be accurately made into a circular shape by the cylindrical beam expander. Also, where no cylindrical beam expander is used, the major axis of the elliptical beam cross-section can be made exactly perpendicular to the scanning direction. In FIGS. 8A and 8B, the unnumbered members are similar to the members in FIGS. 2 and 3.

Figure 9:
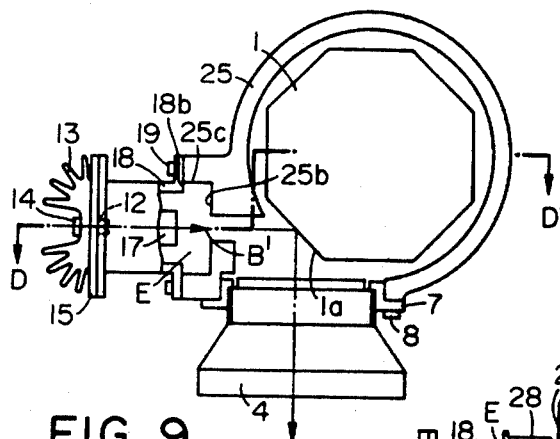
FIG. 9 is a cross-sectional plan view of a fifth embodiment of the present invention.
Figure 10:
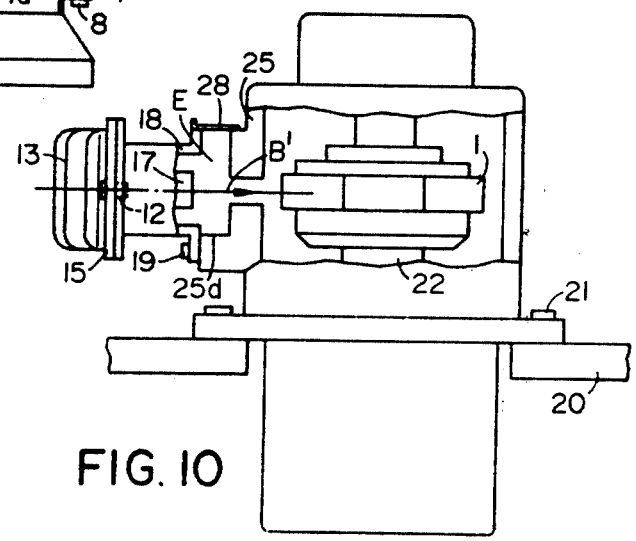
FIG. 10 is a cross-sectional view taken along line DD' of FIG. 9.
Figure 11:
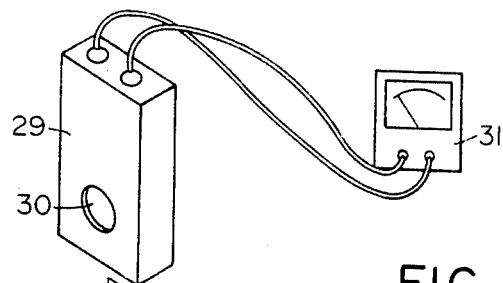
FIG. 11 is a perspective view of the embodiment shown in FIGS. 9 and 10.

FIGS. 9, 10 and 11 show an embodiment in which an insertion hole into which a measuring device for measuring the intensity of the laser beam B' is inserted is provided between the rotatable polygon mirror 1 and the semiconductor laser 12. The insertion hole E is provided as an upwardly opening square hole in the connecting portion between the outer case 25 and the holding cylinder 18 and, as shown in FIG. 11, an intensity measuring device 29 is inserted into the insertion hole E from thereabove. The intensity measuring device 29 has a light-receiving portion 30 made of a photodiode or the like and, when the intensity measuring device 29 is inserted, the outer configuration of the intensity measuring device 29 is guided by wall surfaces 25b, 25c, 25d and 18b and the light-receiving portion 30 is located at the position of the laser beam B'. Designated by 31 is a voltmeter for displaying the output of the intensity measuring device 29. Designated by 28 in FIG. 10 is a lid for preventing dust from entering into the light deflecting device through the insertion hole E when the intensity measuring device 29 is not used. In the above-described construction, the intensity of the laser beam immediately after having left the semiconductor laser 12 can be measured independently of the reflection factor of the rotatable polygon mirror 1 and the transmittivity of the f·θ lens 4 and therefore, such construction is effective where it is desired to measure the intensity of the laser beam immediately after having left the semiconductor laser 12 in order to check up the deterioration or the like of the semiconductor laser 12. In FIGS. 9, 10 and 11 the members given the same numbers as those in FIGS. 2 and 3 are similar to the members in FIGS. 2 and 3.

Figure 12:
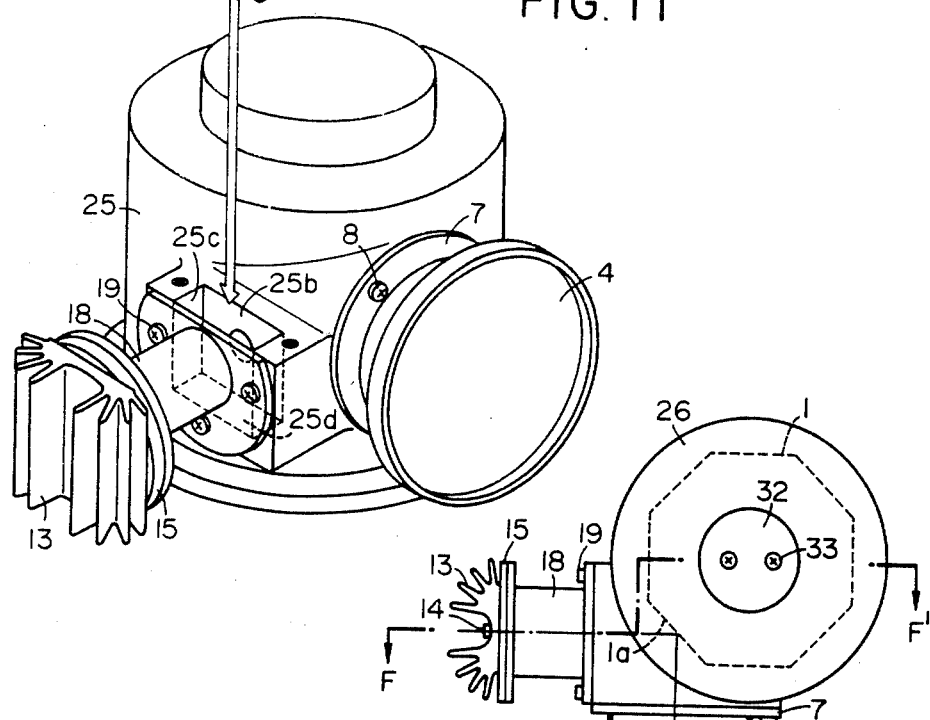
FIG. 12 is a plan view of a sixth embodiment of the present invention.
Figure 13:
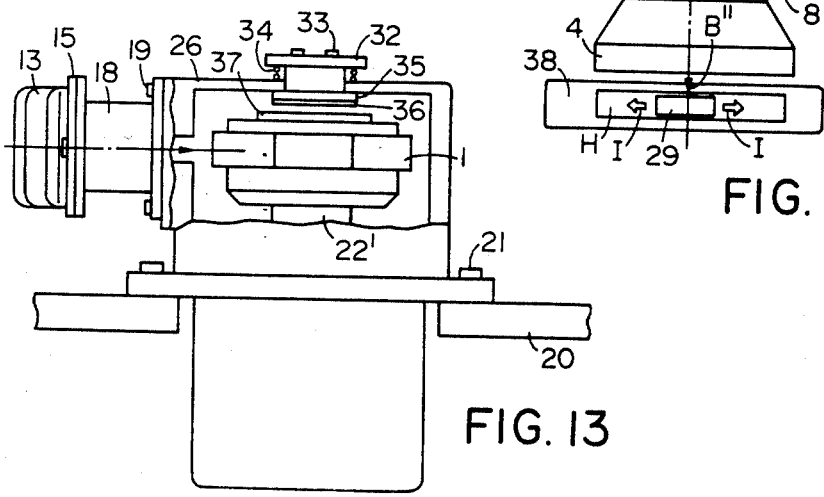
FIG. 13 is a cross-sectional view taken along line FF' of FIG. 12.
Figure 14:
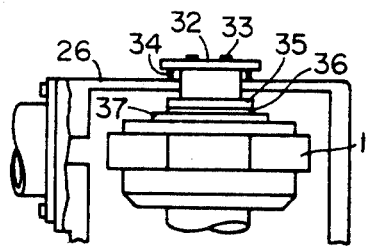
FIG. 14 is a fragmentary cross-sectional view taken along line FF' of FIG. 12 and illustrating the operation of the sixth embodiment.

FIGS. 12 and 13 show an embodiment in which the rotatable polygon mirror 1 can be rotated manually from the outside thereof without disassembling the light deflecting apparatus. Reference numeral 32 designates a rotation knob, 35 a push shaft, 36 a friction member having a great surface friction such as rubber or the like adhesively secured to the underside of the shaft 35 and 34 a compression coil spring. The push shaft 35 is secured to the rotation knob 32 by means of screws 33. When the light deflecting apparatus is operating, these members are upwardly biased by the compression coil spring 34 as bias means and the friction member 36 is not in contact with a rotatable polygon mirror keep plate 37. Where it is desired to manually rotate the rotatable polygon mirror 1, the rotation knob 32 may be depressed toward the outer case 26 and, as shown in FIG. 14, the friction member 36 may be caused to bear against the rotatable polygon mirror keep plate 37, and then the rotation knob 32 may be rotated. The rotatable polygon mirror 1 is rotated with the rotation knob 32 due to the friction between the rotatable polygon mirror keep plate 37 and the friction member 36.

When there is such a mechanism, the mirror surface 1a can be stopped in any desired direction. Accordingly, when it is desired to measure the intensity of the laser beam including the reflection factor of the rotatable polygon mirror 1 and the transmittivity of the f·θ lens, and where the insertion hole E into which the intensity measuring device 29 may be inserted is not provided between the semiconductor laser 12 and the rotatable polygon mirror 1 because of the limited space, the intensity measuring device 29 may be placed forwardly of the f·θ lens 4 and the laser beam B″ reflected by the mirror surface 1a may be properly directed toward the light-receiving portion 30 of the intensity measuring device 29 to thereby measure the intensity of the laser beam. Designated by 38 is a holding plate for holding the intensity measuring device 29 at a predetermined position. By this holding plate 38, the intensity measuring device 29 is located in a direction perpendicular to the plane of the drawing sheet and with respect to the direction of the optic axis of the f·θ lens 4. A hole H in which the intensity measuring device 29 is inserted is in the form of a square hole elongated in the scanning direction of the laser beam B″ and, when it is difficult to accurately stop the mirror surface 1a in a predetermined direction due to cogging or the like of the motor, it is possible to bring the light-receiving portion 30 exactly to the position of the laser beam B″ by deviating the intensity measuring device 29 in the direction of arrow I of the square hole H and finely adjusting the position thereof. The holding plate 38 may be attached to the outer case 26 of the light deflecting apparatus or to the base plate 20.

In FIGS. 12, 13 and 14 the members given numbers similar to those in FIGS. 2 and 3 are similar to the members in FIGS. 2 and 3. Designated by 22′ is a rotary shaft on which the rotatable polygon mirror 1 is mounted.

Figure 15:
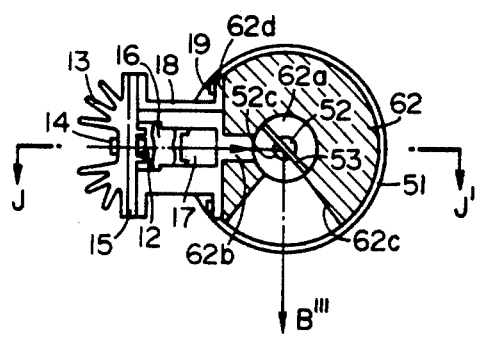
FIG. 15 is a cross-sectional view of a seventh embodiment of the present invention.
Figure 16:
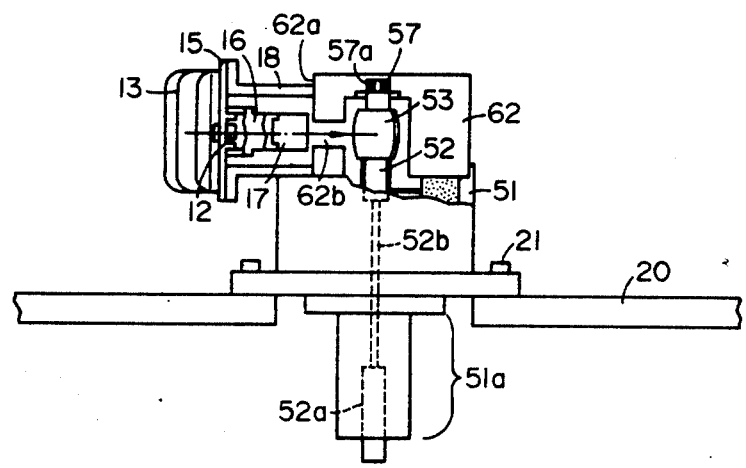
FIG. 16 is a cross-sectional view taken along line JJ' of FIG. 15.

FIGS. 15 and 16 show still another embodiment of the present invention. In this embodiment, in contrast with the previously described light deflecting apparatus using a rotatable polygon mirror, a semiconductor laser as a light source is installed in a light deflecting apparatus comprising a mirror secured to a reversible rotation motor having the rotation angle of the rotary vibrator thereof controlled by the restitutional force of a torsion spring bar which resists the drive force generated by the motor. Designated by 51 is the outer case of the motor which has a mount portion 51a. Denoted by 52 is a torsion spring bar having a lower fixed portion 52a, a spring portion 52b and an upper cut-away portion 52c. The lower fixed portion 52a is fixed to the mount portion 51a of the outer case 51 by means of a screw, not shown. Designated by 53 is a light beam scanning mirror adhesively secured to the cut-away portion 52c of the torsion spring bar 52. Denoted by 57 is a ball bearing secured to the upper end portion of the torsion spring bar. The torsion spring bar 52, the mirror 53, the ball bearing 57, and an armature and speed detector (not shown) provided on the upper end portion of the torsion spring bar together constitute the rotary vibrator of the light deflecting apparatus. Designated by 62 is the vertical cylinder of the outer case 51 in which the outer race 57a of the ball bearing 57 of the vibrator is fitted and which is secured to the case 51 concentrically therewith. The vertical cylinder 62 has a mirror chamber 62a enclosing therein the mirror 53 of the vibrator, and incidence and emergence windows 62b and 62c for the light beam. The vertical cylinder 62 further has a mounting surface and unshown threaded hole for securing the holding cylinder 18 to secure the light source including the aforementioned conductor laser 12.

The laser beam B‴ generated by the laser 12 is reflected by the mirror 53 and outputted from the emergence window 62c. The mirror 53 effects reversible rotational movement by an alternate current being applied to a field magnet constituting a stator, not shown, and therefore the reflected laser beam B‴ is deflected in a sector form. The reversible rotation motor is described in detail in commonly assigned U.S. patent application Ser. No. 915,079 filed June 13, 1978.

The above-described present invention has the following advantages.

First, the mirror, light source and lens system are formed as a unit and this leads to compactness of the scanning optical system and compactness of the system using the light deflecting apparatus. Also, this formation as a unit leads to the possibility of omitting the heretofore required member for mounting and holding the light source and lens system and part of the dust-proof window glass and thus, to reduced cost of the scanning optical system.

Further, the formation of the mirror light source and lens system as a unit enables the optical adjustment which has heretofore been done for each unit or done after the respective units have been mounted on the base plate of the system to be collectively carried out in the light deflecting apparatus, and thus the optical adjustment can be accomplished simply and in a short time.

Also, the emergence surface of the semiconductor laser, the collimator lens and the cylindrical beam expander can be contained in the interior of the sealed case of the light deflecting apparatus and this leads to prevention of a loss of quantity of light which would otherwise result from deposition of dust on the glass or lens surface.

What I claim is:

1. A light deflecting apparatus for deflecting a light beam to scan over a predetermined scanned surface, comprising:
   a mirror for deflecting the light beam;
   a case enclosing said mirror and being attached to a base plate;
   a laser oscillator attached to said case in spaced-apart relationship with the base plate for generating the light beam; and
   a lens for forming an image of the light beam on said scanned surface.

2. The light deflecting apparatus according to claim 1, further comprising a mechanism for mounting a measuring device for providing a measurement of the intensity of the light beam outside the apparatus.

3. The light deflecting apparatus according to claim 2, wherein said measuring device is mounted between said light source and said mirror.

4. The light deflecting apparatus according to claim 1, wherein said mirror is a polygon mirror.

5. The light deflecting apparatus according to claim 1, wherein said laser oscillator is a semiconductor laser.

6. The light deflecting apparatus according to claim 5, wherein a collimator optical system for making the output beam of said semiconductor laser into a parallel beam is disposed between said semiconductor laser and said mirror.

7. The light deflecting apparatus according to claim 6, wherein an optical system for making the cross-sectional shape of said parallel beam into a circular shape is disposed between said collimator optical system and said mirror.

8. A light deflecting apparatus for deflecting a light beam to scan over a predetermined scanned surface comprising:
   a mirror for deflecting the light beam;
   a first case enclosing said mirror;
   a laser oscillator for generating the beam;
   a second case to which said laser oscillator is attached;
   locating means for attaching said second case to said first case;
   an adjusting means for adjusting the attachment position of said second case to said first case; and
   a lens for imaging the light beam on said scanned surface.

9. The light deflecting apparatus according to claim 8, wherein said locating means is constituted by a cylindrical fitting portion.

10. The light deflecting apparatus according to claim 9, wherein said cylindrical fitting portion comprises a cylindrical projected portion provided on said first case and a cylindrical inside diameter surface provided in said second case.

11. The light deflecting apparatus according to claim 8, wherein said adjusting means comprises a locating pin and said first and second cases are provided with holes in which said pin is inserted.

12. The light deflecting apparatus according to claim 8, wherein said mirror is a polygon mirror.

13. The light deflecting apparatus according to claim 12, wherein an f-θ lens is provided in the beam emergence port of said first case.

14. A light deflecting apparatus for deflecting a light beam to scan over a scanned surface, comprising:
   a laser oscillator for generating a light beam;
   a mirror for deflecting the light beam;
   a motor mechanism for rotating said mirror;
   a housing for enclosing said mirror and said motor mechanism; and
   manual rotating means provided on said housing for manually rotating said mirror, said manual rotating means being capable of rotating said mirror in said housing by access through said housing from the outside.

15. The light deflecting apparatus according to claim 14, wherein said rotating means has bias means for separating said rotating means from said mirror when said mirror is not manually rotated.

16. The light deflecting apparatus according to claim 15, wherein a friction member is provided in the portion of contact between said mirror and said rotating means.

17. The light deflecting apparatus according to claim 14, wherein said mirror is a polygon mirror.

* * * * *